June 13, 1967  J. M. RHOADES  3,324,891
FLOW REGULATOR
Filed April 18, 1961
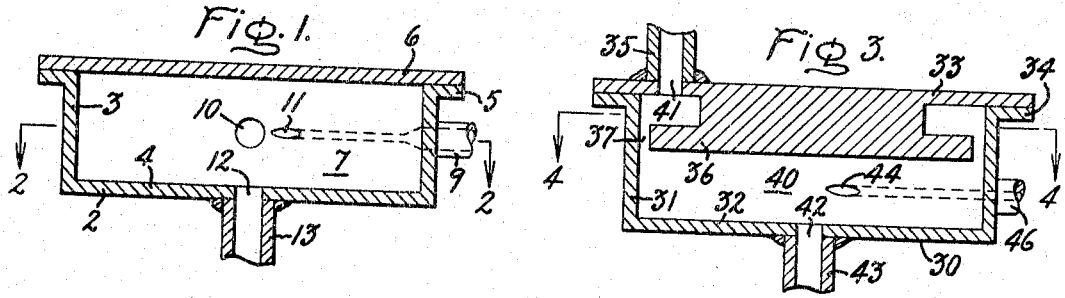
Fig. 1.
Fig. 3.
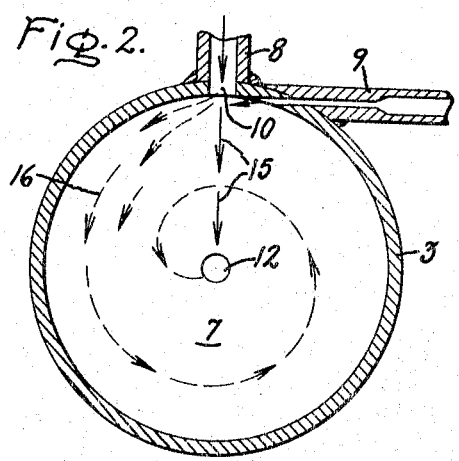
Fig. 2.
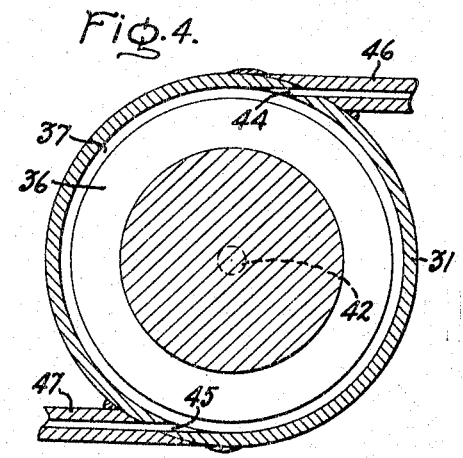
Fig. 4.
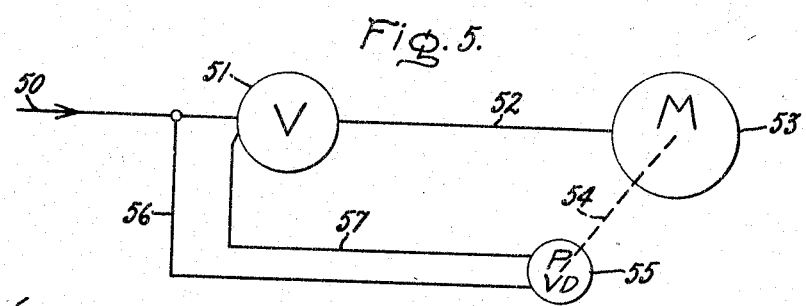
Fig. 5.
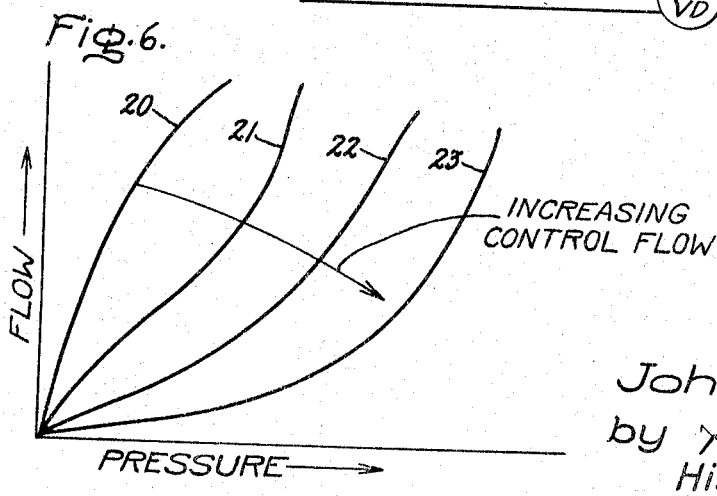
Fig. 6.
INCREASING CONTROL FLOW
FLOW
PRESSURE
Inventor:
John M. Rhoades,
by Paul A. Frank
His Attorney.

United States Patent Office 3,324,891
Patented June 13, 1967

3,324,891
FLOW REGULATOR
John M. Rhoades, Waynesboro, Va., assignor to General Electric Company, a corporation of New York
Filed Apr. 18, 1961, Ser. No. 103,824
14 Claims. (Cl. 138—43)

The present invention relates to flow regulators and, more particularly, to flow regulators which do not utilize mechanical flow impeding means.

In recent years, reliability has received great emphasis, especially in technologies such as the control art. In machine tools, rocket motors, internal combustion engines, components such as valves, pistons, diaphragms, and vanes, have been most commonly utilized to control fluid flow. It has been found from experience that these mechanical control members have been by far the greatest source of control system failure. The malfunction of an apparently insignificant control valve in a rocket engine of a space vehicle is a dramatic example of the consequences of control system breakdown. The vehicle not only malfunctions and cannot be repaired, but probably complete destruction of the vehicle is required.

The inability to repair a malfunctioning control member and the possible extent of resulting damage indicate the need for rugged, durable and simple control elements and systems. There is also emphasized the need for control elements of novel design, the reduction in the number of vulnerable elements in a system, and in some instances, the substitution of novel means and methods for controlling fluid flow.

The chief object of the present invention is to provide an improved flow regulator.

The object of the invention is to provide an improved flow regulator having no moving mechanical parts.

Another object of the invention is to provide an improved flow regulator utilizing working fluid to perform the flow control function.

These and other objects of my invention may be more readily perceived from the following description.

One of the features of my invention is a flow regulator having a chamber with arcuate peripheral walls wherein supply fluid may be passed adjacent the peripheral walls. A jet of control fluid may be supplied into the chamber tangentially in a manner whereby the control fluid restrains the passage of supply fluid into the chamber and through the regulator.

The attached drawings illustrate preferred embodiments of the invention, in which:

FIGURE 1 is a sectional view of a flow regulator for practicing the present invention;

FIGURE 2 is a sectional view taken through line 2—2 in FIGURE 1;

FIGUE 3 is a sectional view of another embodiment of the invention;

FIGURE 4 is a sectional view of the apparatus shown in FIGURE 3 taken through line 4—4;

FIGURE 5 is a schematic view of a system employing the present invention; and

FIGURE 6 is a diagram plotting fluid flow through the valve versus pressure drop through the valve for varying control fluid flows.

In FIGURES 1 and 2 there are shown sectional views of a flow regulator for practicing the present invention, FIGURE 2 being a view of the flow regulator taken through line 2—2 in FIGURE 1. The flow regulator basically comprises a housing member 2 which includes cylindrical wall 3 and a bottom planar portion 4 which define a cup-shape cavity. Adjacent the opening of the cup-shape cavity may be provided a circular flange 5 adapted to engage and be bolted to end member 6. End member 6, cylindrical wall 3, and planar portion 4 define chamber 7 into which fluid is supplied and within which may be provided suitable means, other than mechanical means, for regulating the passage of fluid through chamber 7. Supply fluid at an elevated pressure may be introduced into chamber 7 through opening 10 which is shown in FIGURE 2 as being the opening at the terminal end of conduit 8. Because of the radial orientation of conduit 8 with respect to chamber 7, the fluid is introduced diametrically into chamber 7. To control the passage of supply fluid from opening 10 into chamber 7 there may be located adjacent opening 10, opening 11 of conduit 9 associated with a source of control fluid which tangentially discharges a jet of fluid in a direction substantially normal to the flow of supply fluid from opening 10. Fluid supplied to chamber 7 may be discharged therefrom through opening 12 (FIGURES 1 and 2) connected to conduit 13 which is a discharge line of the apparatus. In this particular construction, opening 12 is centrally located in chamber 7 remote from the cylindrical wall 3 for a purpose more fully described hereinafter.

In the operation of the flow regulator described above, fluid which is to be regulated is supplied at a predetermined pressure through conduit 8 and discharged in a radial direction through opening 10 toward the discharge opening 12 in chamber 7. Rather than supply mechanical closure means for throttling the flow of fluid through opening 10, the present invention utilizes a jet of control fluid which may be at supply pressure or at pressures greater or lower than supply pressure. Because of the tangential direction of the jet of control fluid, the supply fluid from opening 10 is deflected away from its normal radial path. The supply fluid deflected from the straight path to opening 12 has imparted thereto a general arcuate path and follows the flow of the control jet fluid which has a substantially spiral flow direction toward discharge opening 12. The vortex of control fluid in chamber 7 creates a back pressure which impedes and, consequently, regulates the flow of supply fluid. In FIGURE 2 the normal flow of supply from the opening 10 is shown by arrows 15. This flow is prevalent under circumstances when no control fluid is supplied through opening 11. The control jet fluid imparts to the supply fluid passing through opening 10 an arcuate path which follows the arcuate contour of the peripheral wall of chamber 7. The combined control and supply fluids achieve a spiral direction flow and are discharged through opening 12. The spiral path is shown by dotted arrows 16 shown in FIGURE 2.

In the embodiment shown in FIGURES 1 and 2, it is noted that the control jet is supplied to the chamber in a direction substantially normal to the supply fluid flow. This preferred orientation of the control jet may be varied. For example, the inlet may be located at approximately 180 degrees or some other angle from the supply fluid opening. The basic function of the control jet is to deflect the fluid introduced through opening 10. In some instance, it may be desired that the pressure of the control jet may be of sufficient magnitude to completely impede the passage of the fluid through opening 10. Under such circumstances, only control jet fluid is passed through discharge outlet 12 through conduit 13 from the flow regulator.

In FIGURE 6, there is shown a diagram plotting the total flow from the flow regulator (through discharge opening 12) versus the pressure drop or pressure differential between the inlet pressure supplied at opening 10 and the pressure of the fluid discharged through discharge opening 12. In FIGURE 6 there are illustrated four curves, 20, 21, 22, and 23, each curve representing a constant amount of control jet fluid being supplied to chamber 7. Curve 20 illustrates a condition wherein no control fluid is supplied. Curves 21, 22, and 23 illustrate increasing amounts of control fluid supplied to chamber 7. Curve 20 with no control fluid flow shows that with large flow rates, the pressure drop increases rapidly. Curve 23 illustrates the other extreme conditon wherein substantial control fluid is supplied to chamber 7. With this magnitude of control fluid flow, initially the pressure drop increases rapidly with flow and then flow increases more rapidly with smaller pressure changes.

In FIGURE 3 there is shown another embodiment of a flow regulator for practicing the present invention. The regulator comprises a housing 30 which includes cylindrical wall 31 and planar end portion 32. The cylindrical wall may terminate in a flanged portion 34 adapted to engage the closure member 33. Closure member 33 includes a closure portion adapted to engage flange 34 and also includes means for passing supply fluid to chamber 40 which is defined by the closure member and housing member 30. Closure member 33 includes a spaced flange 36 which coacts with cylindrical wall 31 to define an annular orifice 37 located immediately adjacent cylindrical wall 31. Closure member 33 with wall 31 defines an annular passage or plenum 41 placing supply line 35 in communication with orifice 37. From this view it can be seen that supply fluid passes through annular passage 41 and is discharged through the annular orifice 37 into chamber 41 adjacent cylindrical wall 31.

FIGURE 4 is a sectional view taken through line 4—4 in FIGURE 3 showing that the control fluid jets are discharged through openings 44 and 45 which tangentially enter chamber 40 through cylindrical wall 31. The control fluid passed to openings 44 and 45 is supplied through conduits 46 and 47, in a manner similar to the apparatus shown in FIGURE 1. The combined supply fluid and control fluid in chamber 40 may be discharged through central opening 42 which is connected to discharge line 43.

The operation of the apparatus shown in FIGURES 3 and 4 is substantially similar to that shown in FIGURES 1 and 2. Fluid in this embodiment, rather than being supplied adjacent the chamber walls from a radial extending passage, is supplied from a radially extending orifice which is located adjacent the chamber wall. In this embodiment, however, in order to control the fluid passing through chamber 40, two tangentially oriented control fluid openings are provided which supply a swirling or spiraling flow of control fluid through the chamber to impede the passage of the fluid passing through orifice 37. In this manner, the fluid flow through the chamber is impeded in a manner similar to that previously outlined with respect to the apparatus in FIGURES 1 and 2.

In FIGURE 5 there is shown a constant speed motor system employing the present invention. Fluid may be supplied through conduit 50 to valve 51 constructed in accordance with the present invention. The discharge fluid from valve 51 is passed through line 52 to a suitable pneumatic or hydraulic motor 53 which may be connected by means of a shaft 54 or other means to a variable discharge pump 55 (pressure and/or volume) having supplied thereto supply fluid from conduit 50 through conduit 56. Control fluid is discharged from pump 55 through conduit 57 to the control fluid jet in valve 51 to regulate the supply fluid passing therethrough.

From this schematic diagram, it can be seen that a substantially constant speed pneumatic motor system may be achieved. The output speed of motor 53 controls the discharge flow from pump 55 to regulate the control fluid supplied to valve 51 which thereby regulates the supply of fluid through conduit 52 to motor 53. With decreases in motor speed, the control fluid supplied to valve 51 decreases thereby permitting a larger amount of fluid to pass through valve 51 and conduit 52 to motor 53, and as the motor speed increases, the control fluid flow supplied to valve 51 increases thereby throttling the supply fluid passing therethrough. In this manner, a flow regulator system having no mechanical or moving parts is provided which is not prone to malfunction due to the presence of dirt or other materials in the fluid, nor is it possible for closure members to freeze in position resulting in system failure.

While I have described preferred embodiments of my invention, it will be understood that the invention is not limited thereto since it may be otherwise embodied within the scope of the appended claims.

What I claim as new and desire to secure by Letters Patent of the United States is:

1. In a flow regulator, the combination of means defining a chamber having peripheral walls, first means for supplying fluid to said chamber adjacent said peripheral walls and radially inward thereof, means remote from said peripheral walls for discharging fluid from the chamber, and means for supplying a control fluid having an arcuate path through said chamber and being substantially normal to the direction of fluid flow from said first means to restrain the fluid flow through said chamber.

2. In a flow regulator, the combination of means defining a chamber having peripheral walls, means for supplying a supply fluid to said chamber adjacent said peripheral walls and radially inward thereof, means remote from said peripheral walls for discharging fluid from the chamber, and means for supplying a control fluid having an arcuate path through said chamber and being substantially normal to the direction of supply fluid flow from said supply fluid means to substantially terminate the fluid flow from the supply fluid means through said chamber.

3. In a flow regulator, the combination of means defining a chamber having peripheral walls, means for supplying a supply fluid to said chamber adjacent said peripheral walls and radially inward thereof, means remote from said walls for discharging fluid from said chamber, and means for supplying control fluid having a substantially spiral path through said chamber and being substantially normal to the direction of supply fluid flow from said supply fluid means to restrain fluid flow of supply fluid through the chamber.

4. In a flow regulator, the combination of means defining a chamber having annular walls, means for supplying fluid adjacent the annular walls for supply radially into the chamber, means remote from said annular walls for discharging fluid from said chamber, and means for supplying control fluid to said chamber in a tangential direction relative to said annular walls and substantially normal to the direction of supply fluid flow from said supply fluid means whereby the control fluid follows in an arcuate path in the chamber to restrain the flow of supply fluid through said chamber.

5. In a flow regulator, the combination of means defining a chamber having annular walls, a radial passage extending through said annular walls for supplying fluid to said chamber, means remote from said annular walls for discharging fluid from said chamber, and a tangential passage passing through said annular walls to supply control fluid having an arcuate flow through said chamber to restrain the flow of supply fluid through said chamber.

6. In a flow regulator, the combination of means defining a chamber having annular walls, a radial supply passage extending through said annular walls into said chamber for supplying a radial flow of supply fluid through said chamber in the absence of a control fluid flow, means for supplying control fluid to said chamber tangentially through said walls and substantially normal to the direction of the supply fluid flow from said radial passage to restrain the flow of supply fluid through said chamber, and means for discharging fluid from said chamber located remote from said annular walls.

7. In a flow regulator, the combination of means defining a chamber having annular walls, a circular member spaced from said walls substantially defining an annular orifice, means for supplying fluid to said annular orifice, means for supplying control fluid to said chamber having an arcuate path in said chamber to restrain the flow of fluid supplied through said annular orifice, and means remote from said annular walls for discharging fluid from said chamber.

8. In a flow regulator, the combination of means defining a chamber having annular walls, a circular member spaced from said walls defining an annular orifice, means for supplying fluid to said annular orifice, a tangential passage extending through said annular walls for supplying control fluid through said chamber to restrain the flow of fluid supplied through said annular orifice, said control fluid having a substantially spiral path through said chamber, and means remote from said annular walls for discharging said fluid.

9. A fluid flow control device comprising:
   a housing defining a circular swirl chamber having an axial opening through which a pressurized fluid is discharged,
   a first inlet port formed in said housing through which pressurized supply fluid is injected radially inwardly into said swirl chamber, and
   a second inlet port formed in said housing at a point in said swirl chamber circumferentially disposed at least ninety degrees from said first inlet port and through which a pressurized control fluid is injected tangentially into said swirl chamber thereby establishing a vortex flow,
   said flow of pressurized supply fluid injected by said first inlet port being intercepted by said vortex flow which opposes the flow from said first inlet port to effect a corresponding control of flow of said pressurized supply fluid through said axial opening.

10. A fluid flow control device comprising:
    a housing defining a circular swirl chamber having an axial opening through which a pressurezed fluid is discharged,
    a first inlet port formed in said housing through which pressurized supply fluid is injected radially inwardly into said swirl chamber,
    a second inlet port formed in said housing through which a pressurized control fluid is injected tangentially into said swirl chamber at a point in said swirl chamber diametrically opposite said first inlet port and thereby establishing vortex flow, said flow of pressurized supply fluid injected by said first inlet port being intercepted by said vortex flow which opposes the flow from said first inlet port to effect corresponding supply of said pressurized control fluid through said axial opening, and
    flow control means operatively connected to said second inlet port for controlling the fluid flow therethrough and thus the vortex flow in said swirl chamber.

11. A fluid flow control device as claimed in claim 9 wherein the pressurized control fluid supplied to said second inlet port is at a higher pressure than the said pressurized supply fluid supplied to said first inlet port.

12. A fluid flow control device comprising:
    a housing defining a circular swirl chamber having an axial opening through which a pressurized control fluid is discharged,
    a first inlet port formed in said housing through which said pressurized control fluid is injected radially inwardly into said swirl chamber, and
    a second inlet port formed in said housing at a point in said swirl chamber circumferentially disposed from said first inlet port and through which a pressurized fluid is injected tangentially into said swirl chamber thereby establishing a vortex flow,
    said flow of pressurized control fluid injected by said first inlet port being intercepted by said vortex flow which opposes the flow from said first inlet port to effect a corresponding control of flow of said pressurized control fluid through said axial opening.

13. A fluid flow control device comprising:
    a housing defining a circular swirl chamber having an axial opening through which a pressurized control fluid is discharged,
    a first inlet port formed in said housing through which said pressurized control fluid is injected radially inwardly into said swirl chamber,
    a second inlet port formed in said housing through which a pressurized fluid is injected tangentially into said swirl chamber at a point in said swirl chamber circumferentially spaced from said first inlet port and thereby establishing vortex flow, said flow of pressurized fluid injected by said first inlet port being intercepted by said vortex flow which opposes the flow from said first inlet port to effect corresponding control of said pressurized control fluid through said axial opening, and
    flow control means operatively connected to said second inlet port for controlling the fluid flow therethrough and thus the vortex flow in said swirl chamber.

14. A fluid flow control device as claimed in claim 12 wherein the pressurized fluid supplied to said second inlet port is at a higher pressure than the said pressurized control fluid supplied to said first inlet port.

References Cited

UNITED STATES PATENTS

| 1,381,095 | 6/1921 | Starr | 239—468 |
| 1,517,598 | 12/1924 | Stevenson | 137—604 |
| 1,842,877 | 1/1932 | Muller et al. | 138—46 |
| 2,653,801 | 9/1953 | Fontein | 138—46 |
| 2,893,432 | 7/1959 | Gibson | 138—42 |
| 3,057,227 | 1/1963 | Bowles | 15—346 |
| 3,276,259 | 10/1966 | Bowles et al. | 73—194 |

FOREIGN PATENTS

| 444,103 | 3/1936 | Great Britain. |
| 614,824 | 12/1948 | Great Britain. |
| 954,941 | 6/1949 | France. |
| 1,126,203 | 3/1962 | Germany. |

LAVERNE D. GEIGER, *Primary Examiner.*

T. L. LENNY, E. V. BENHAM, H. K. ARTIS, C. L. HOUCK, *Assistant Examiners.*